US006825859B1

(12) United States Patent
Severenuk et al.

(10) Patent No.: US 6,825,859 B1
(45) Date of Patent: Nov. 30, 2004

(54) SYSTEM AND METHOD FOR PROCESSING CONTENT CHANGES OF ON-SCREEN ITEMS

(75) Inventors: Tony Severenuk, Kemptville (CA); Cory Cooperman, Ottawa (CA); Jennifer Fraser, Ottawa (CA); Ramesh Subramanian, Gloucester (CA); Rex Fang Xu, Nepean (CA)

(73) Assignee: Corel Corporation (CA)

( * ) Notice: Subject to any disclaimer, the term of this patent is extended or adjusted under 35 U.S.C. 154(b) by 390 days.

(21) Appl. No.: 09/711,406

(22) Filed: Nov. 13, 2000

(51) Int. Cl.[7] .............................................. G06F 15/00
(52) U.S. Cl. ....................................... 345/764; 345/762
(58) Field of Search ................................ 345/762, 764, 345/839, 853, 840, 841

(56) References Cited

U.S. PATENT DOCUMENTS

| 5,479,602 | A | | 12/1995 | Baecker et al. |
| 5,564,004 | A | | 10/1996 | Grossman et al. |
| 5,644,739 | A | | 7/1997 | Moursund |
| 5,651,108 | A | * | 7/1997 | Cain et al. ................... 345/781 |
| 5,767,835 | A | | 6/1998 | Obbink et al. |
| 5,831,617 | A | | 11/1998 | Bhukhanwala |
| 5,852,440 | A | | 12/1998 | Grossman et al. |
| 5,880,729 | A | | 3/1999 | Johnston, Jr. et al. |
| 5,903,254 | A | | 5/1999 | Mundt et al. |
| 5,940,078 | A | | 8/1999 | Nagarajayya et al. |
| 6,282,551 | B1 | * | 8/2001 | Anderson et al. ............ 707/503 |
| 6,317,142 | B1 | * | 11/2001 | Decoste et al. .............. 345/762 |

FOREIGN PATENT DOCUMENTS

EP    0 698 844 A2    2/1996    ............ G06F/3/003

* cited by examiner

*Primary Examiner*—Cao (Kevin) Nguyen
(74) *Attorney, Agent, or Firm*—Hayes Soloway P.C.

(57) ABSTRACT

When a content of an on-screen item representing a feature of an application program is changed without user's direct interaction, the present invention provides a visual cue that indicates the content change of the on-screen item to help attracting user's attention to the change.

21 Claims, 10 Drawing Sheets

SYSTEM AND METHOD FOR PROCESSING CONTENT CHANGES OF ON-SCREEN ITEMS

This invention relates generally to the field of a system and method for processing content changes of on-screen items, and more particularly, to a system and method for processing content changes of on-screen item to enhance usability of on-screen items.

BACKGROUND OF THE INVENTION

Many application programs use user interfaces which have icons or on-screen buttons or fields to represent features of the application programs, such as functions, commands, menus, files or windows. These on-screen items are displayed with images, text, or both images and text. Users can select an on-screen item to activate its corresponding feature or to access a drop-down list of features of the application program. To select an on-screen item, users can move a cursor using a user input device, such as a mouse or other pointing device.

Some on-screen items represent features which have variable control values. Some control values are dynamically changed by the application program when the mode of the application changes. For example, an existing graphics application program dynamically changes the value of a spin control to reflect the current position and dimensions of a currently selected object. Accordingly, with a change in selection of objects, the value of the spin control also changes. Thus, the content of an on-screen item representing the spin control is also dynamically changed by the application program. Some users, however, do not notice such changes of the content of the on-screen item because they are not directly working on the on-screen item and their attention is drawn elsewhere.

It is common to provide a group of on-screen items in a row or column on a display screen. Such a row or column of on-screen items is called a toolbar.

There may be more than one toolbar on a display. Some toolbars are customizable, letting a user add and delete on-screen items as required. Other toolbars are not customizable. The application determines which toolbar to be displayed based on the context of the application. Such context-sensitive toolbars are sometimes called property bars.

The on-screen items available on a property bar change according to the mode of the application program. For example, different property bars exist for editing text, graphics, tables or equations. The user can change which on-screen items appear on a specific property bar, but the user cannot change the context in which a specific property bar appears. A specific property bar appears only when the mode of the application program is changed by user's action to use a specific feature. The mode of the application program may change depending on the cursor position. For example, when the user creates a table and places the cursor on the table, the application automatically displays the toolbar for table features. Similarly, when the user is creating indexes, merge files, sound clips, or macros, corresponding property bars appear. Some users do not notice the dynamic changes in the content of the property bar because they are not directly working on the property bar, and the changes of the property bar are instantaneous.

There exist some systems which provide appearance changes of on-screen items. For example, U.S. Pat. No. 5,767,835 issued on Jun. 16, 1998 to Obbink et al discloses on-screen buttons that gradually change from an active state to an inactive state in a predetermined sequence in response to user's selection. The gradual change is provided on a button which the user has just selected. This gradual change is given to provide an entertaining transition to the user. In this system, only one button can be selected. The other buttons are in its active sate so that the user can next select any one of those other buttons. Upon user's selection of one button, the button which was previously selected automatically changes its state from an inactive state to an active state. However, this change is instantaneous at the moment when the selected button becomes an inactive state. Also, there is no need to attract user's attention to this change in this system because this change is expected by the user. U.S. Pat. Nos. 5,852,440 and 5,564,004 issued to Grossman et al on Dec. 22, 1998 and Oct. 8, 1996, respectively, disclose systems that determines which icons are likely to be used next by the user, moves them towards a cursor, and brighten them to facilitate the selection of icons. While these systems change the appearance of icons without direct interaction of users, they change the appearance of icons based on the determination of likelihood as to which icons are used next.

It is therefore desirable to provide a mechanism that is capable of attracting user's attention to content changes of on-screen items that are often made without being noticed by users.

SUMMARY OF THE INVENTION

When a content of an on-screen item representing a feature of an application program is automatically changed without user's direct interaction onto the on-screen item, the present invention provides a visual cue that indicates the content change of the on-screen items to help attracting user's attention to the change.

In accordance with an aspect of the present invention, there is provided a system for processing a content change of an on-screen item representing a feature of an application program. The system comprises a mode change detector, a content changer and a visual cue controller. The mode change detector is provided for detecting a mode change of the application program caused by a user action. The content changer is provided for, in response to the mode change detector, changing a content of an on-screen item which is indirectly related to the user action. The visual cue controller is provided for providing a visual cue that indicates the content change of the on-screen item.

In accordance with another aspect of the invention, there is provided a method for processing a content change of an on-screen item representing a feature of an application program. The method comprises detecting a mode change of the application program caused by a user action; changing, in response to the mode change of the application program, a content of an on-screen item which is indirectly related to the user action; and providing a visual cue that indicates the content change of the on-screen item.

In accordance with another aspect of the invention, a method for providing a visual cue of a content change of an on-screen item representing a feature of an application program. The method comprises allowing a user to select an object displayed on the screen; and displaying a visual cue that indicates a content change of an on-screen item, which content change is caused indirectly by the selection or movement of the object by the user.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
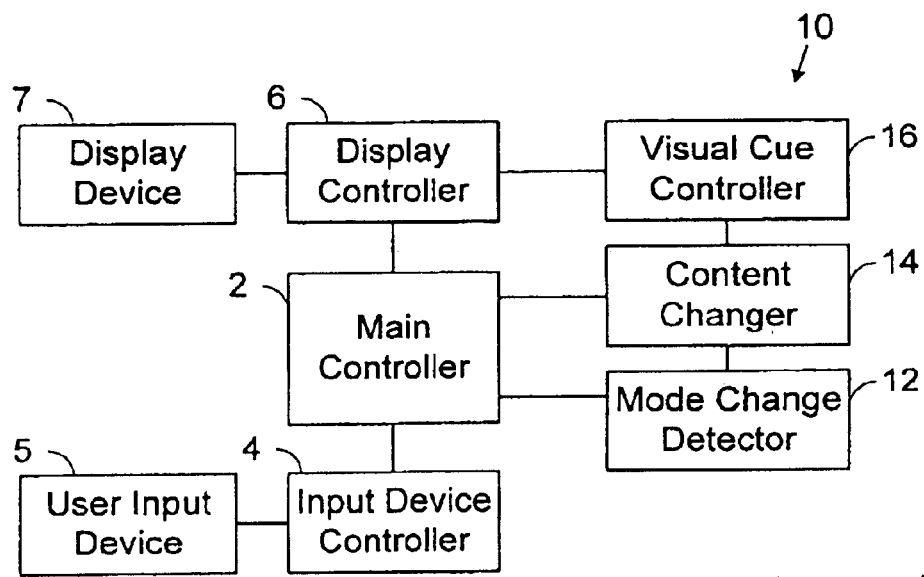
FIG. 1 is a block diagram showing a content change processing system in accordance with an embodiment of the present invention.

Referring to FIG. 1, a content change processing system 10 in accordance with an embodiment of the present invention is described. The system 10 provides a visual cue when the content of an on-screen item is automatically changed without user's direct interaction onto the on-screen item. Such an on-screen item may be an on-screen field, button or icon.

The content change processing system 10 is suitably used in a computer system having a main controller 2, an input controller 4 and a display controller 6. The input controller 4 controls signals from a user input device 5. The user input device 5 may be a mouse, keyboard or other pointing device, or any combination of such user input devices. The display controller 6 controls signals to a display device 7. The input device controller 4 and the display controller 6 may be a part of the main controller 2.

An application program running on the main controller 2 provides a display on the display device 7 through the display controller 6. The display includes one or more toolbars. Each toolbar contains one or more on-screen items.

The content change processing system 10 comprises a mode change detector 12, a content changer 14 and a visual cue controller 16.

The mode change detector 12 detects a change of the mode of the application program. The mode of the application program is changed by a user action, such as moving a cursor about the display and pointing or selecting an object displayed on the screen. The object may be an on-screen item, a table, a graphic and so on.

The content changer 14 changes the content of on-screen items which are not directly interacted by the user at the time of the changes. The content changer 14 may change a property of an on-screen item, such as a control value shown on an on-screen item. The content changer 14 may also change an on-screen item representing a feature to another on-screen item representing another feature. It may change a single or a few items in a toolbar at a time, or may change all items in a toolbar at a time, resulting in a change of the toolbar to a different toolbar.

The visual cue controller 16 provides a visual cue indicating the content change of the on-screen item or items to help attracting user's attention to the change of the on-screen item. The visual cue is an appearance change of the on-screen item to make it stand out and be more prominent. It may be any type of visual cue as long as it is useful in attracting user's attention. For example, it may be a colour change, shape change or design change of the on-screen item, or any combination of these visual changes. The visual change may be provided gradually or spontaneously for a predetermined period that is long enough to be noticeable by the user. For example, the visual change may last for about a half second. The visual changes may be steady or unsteady, e.g., repeatedly flashing changes. An animation showing the transition of the change of the ons-screen bar may also be suitably used.

In FIG. 1, the mode change detector 12 and the content changer 14 are connected to the main controller 2 and the visual cue controller 16 is directly connected to the display controller 6, but they may be all connected to the main controller 2. Also, the content change processing system 10 shown in FIG. 1 comprises the mode change detector 12, the content changer 14 and the visual cue controller 16 as separate components. However, two or more components may be provided as a single component. Furthermore, one or more components may be provided as a part of the main controller 2.

Figure 2:
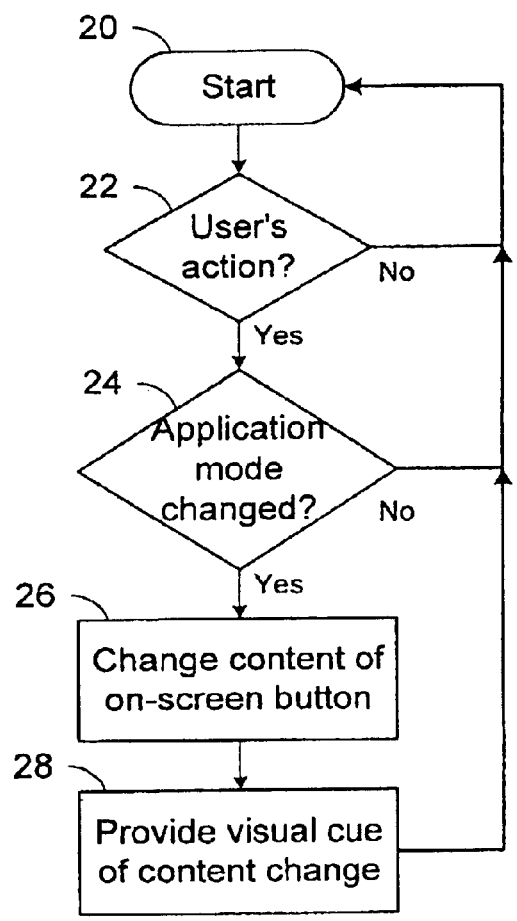
FIG. 2 is a flowchart showing a method of processing a content change in accordance with an embodiment of the present invention.

Referring to FIG. 2, the operation of the content change processing system 10 is described.

When a user performs a certain action (22), the mode or state of the application program changes (24). The mode change detector 12 detects such a mode change of the application program which caused by the user action.

In response to the mode change of the application program, the content changer 14 changes a content of an on-screen item which is not directly related to the user action (26).

In response to the content change of the on-screen item, the visual cue controller 16 provides a visual cue that indicates the content change of the on-screen item (28).

The invention is further described with some examples.

Figure 3:
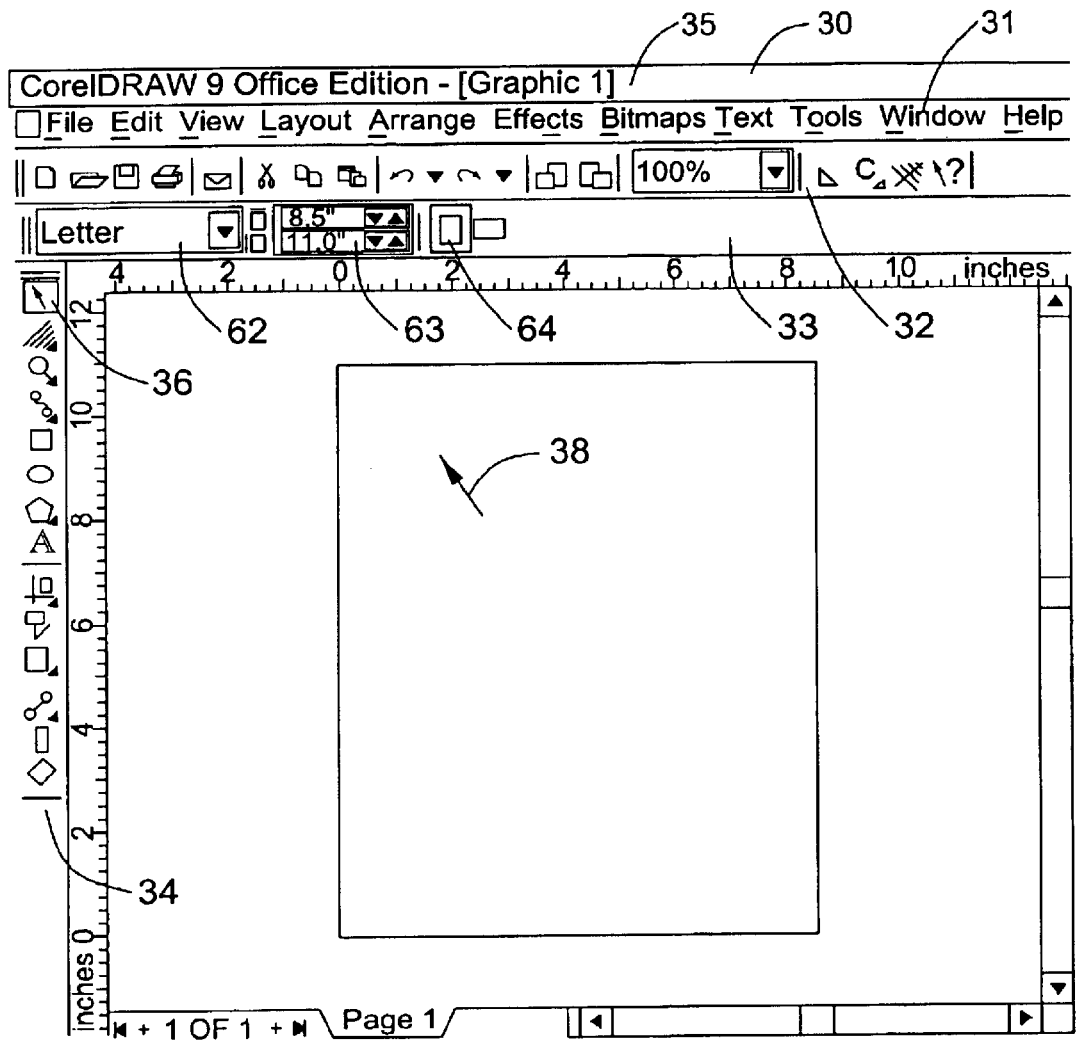
FIG. 3 is a diagram showing an example of a display image.
Figure 4:
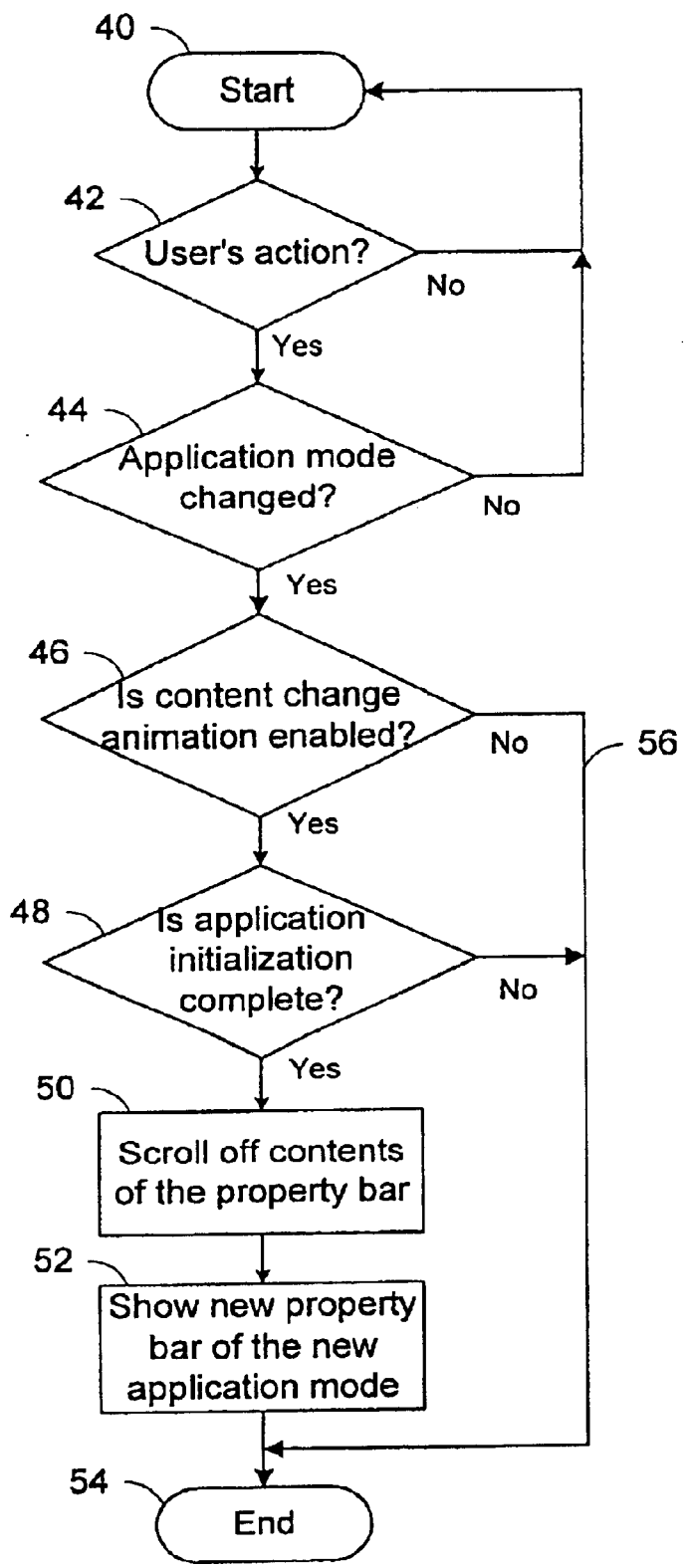
FIG. 4 is a flowchart showing an example of a method for processing a content change of a property bar.

FIG. 3 shows an example of a screen display 30 of a graphics application program. The application program currently provides three horizontal toolbars 31–33 underneath a title bar 35 on the top of the display 30, and a vertical toolbar 34 at the left hand side of the display 30.

The top horizontal toolbar 31 is also called a menu bar. The menu bar 31 contains on-screen items, i.e., menu bar fields, identified by text, e.g., "File", "Edit", "View", and so on. These menu bar fields represent menu items. Each menu item contains a pull-down menu of commands that are grouped by feature.

The second horizontal toolbar 32 and the vertical toolbar 34 contain on-screen items that provide shortcuts for commands of the application program.

The third horizontal toolbar 33 is also called a property bar. The property bar 33 contains on-screen items, i.e., property bar fields, representing tools that users can use to complete a task relating to the context of the application program. The property bar 33 is context-sensitive. The content of the property bar 33 is dynamically changed by the application program depending on the context of the application program in response to user's actions, as described above.

In FIG. 3, the user has selected an on-screen item 36 representing a tool for pointing an object. A cursor or pointer 38 is displayed to allow the user to point an object on the display 30. The property bar 33 currently contains on-screen bars for paper tools. It includes on-screen item 62 for representing selection features of paper type, on-screen items 63 for representing selection features of paper width and height, and on-screen items 64 for representing selection features of paper orientation.

Referring to FIGS. 4, 5A, 5B, 5C, 5D, 6A, 6B, 6C and 6D, an example is described for providing a visual cue for a content change of the property bar 33. In this example, the content change of the property bar 33 is shown with a scrolling animation of the property bar 33.

As shown in FIGS. 5A–5D, in display 60, the original property bar 33 contains the paper type on-screen item 62, paper width/height on-screen items 63 and paper orientation items 64. Using the pointer 38, the user now selects a rectangular tool on-screen item 66 in the toolbar 34 (42 in FIG. 4).

This user action causes a change in the mode of the application program (44). In response to the mode change, the application program automatically changes the content of the property bar 33 from the on-screen items 62–64 for the paper tools to on-screen items 81–83 for the rectangular tools as displayed in the display 80 shown in FIGS. 6A–6D.

Figure 5A:
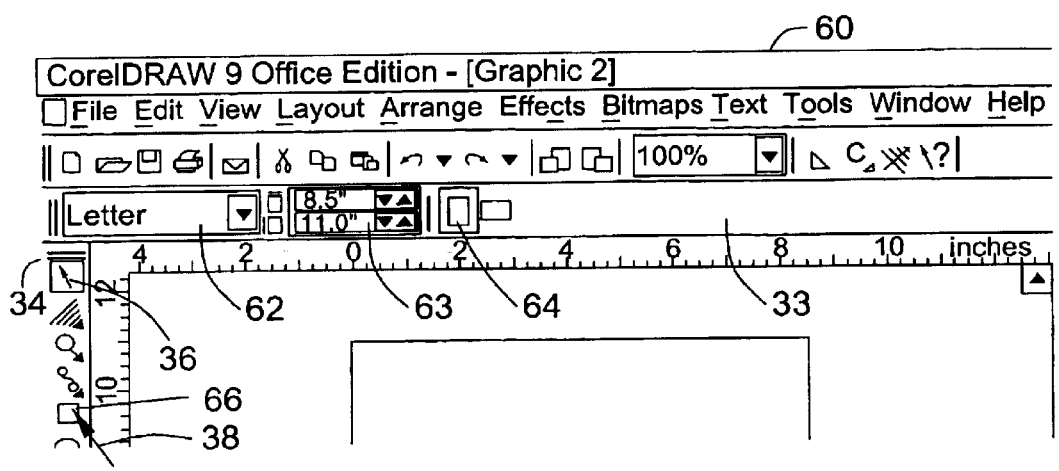
FIGS. 5A–5D are diagrams showing examples of partial display images showing a visual cue provided by the method of FIG. 4.
Figure 5B:
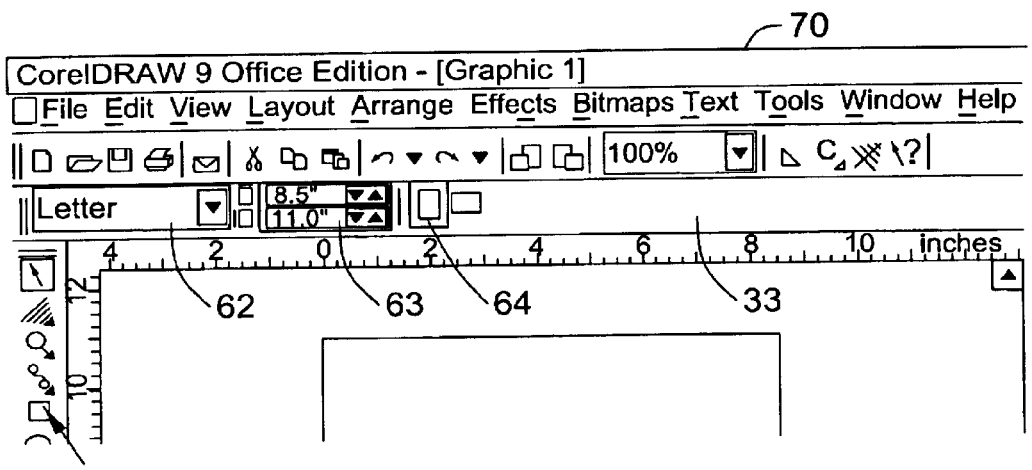
Figure 5C:
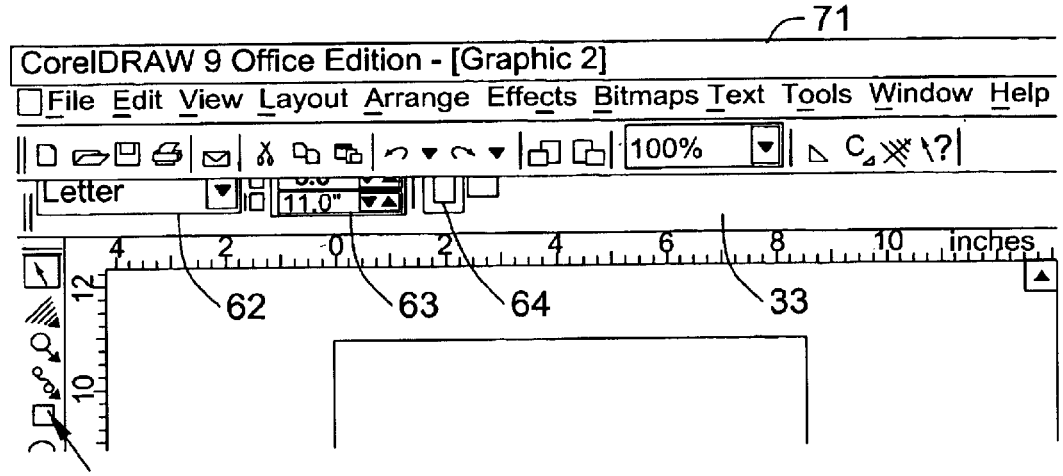
Figure 5D:
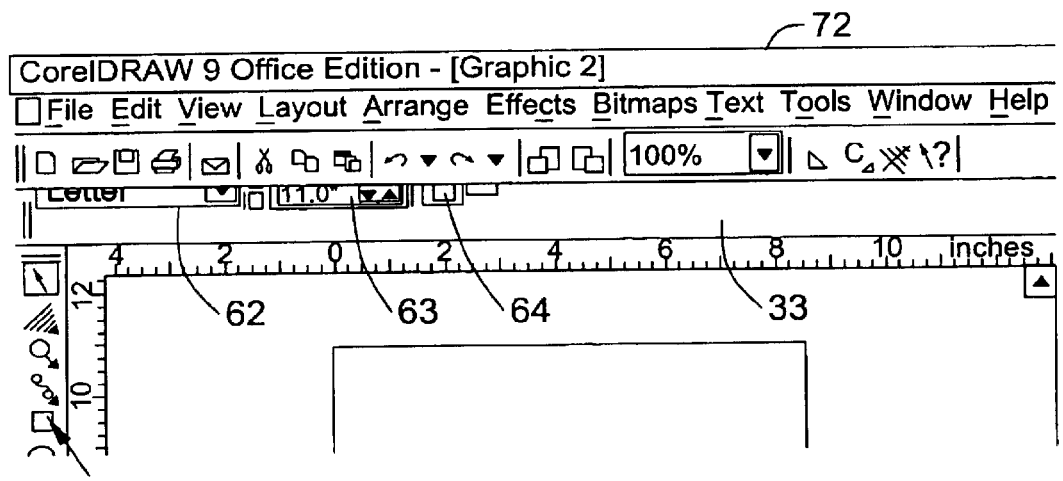

In order to provide a visual cue for this content change of the property bar 33, the content change processing system 10 scrolls off the items 62–64 of the original property bar 33 shown in display 60 of FIG. 5A (50). The displays 70–75 of FIGS. 5B, 5C, 5D, 6A, 6B, and 6C show that the items 62–64 of the property bar 33 are being scrolled off gradually.

Figure 6A:
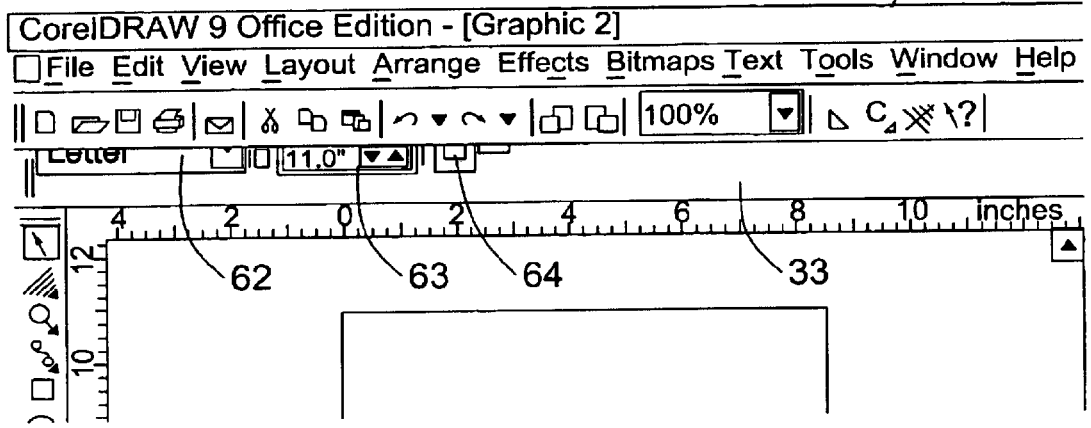
FIGS. 6A–6D are diagrams showing examples of partial display images showing the visual cue provided by the method of FIG. 4.
Figure 6B:
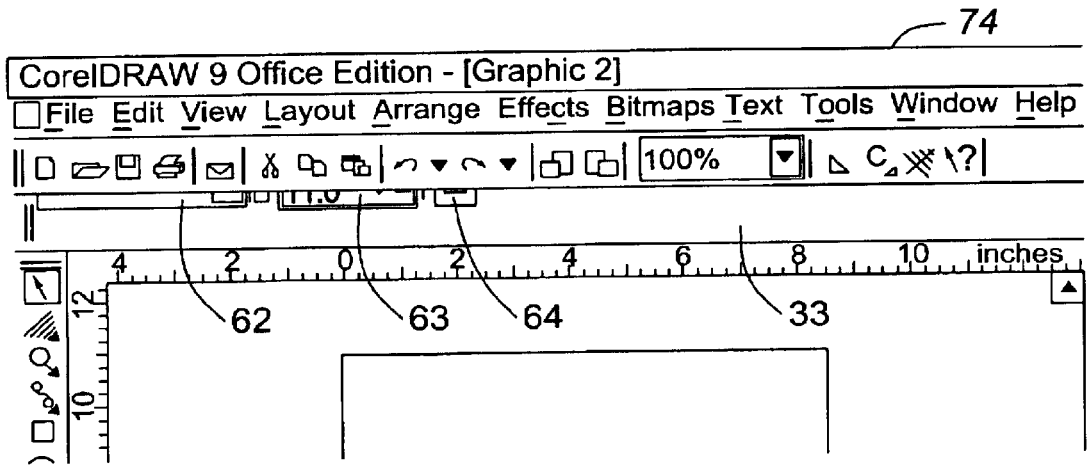
Figure 6C:
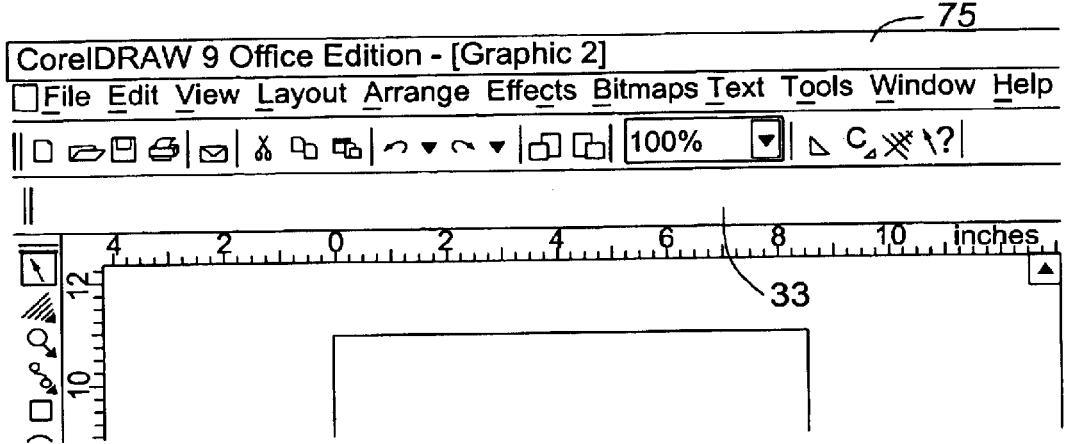
Figure 6D:
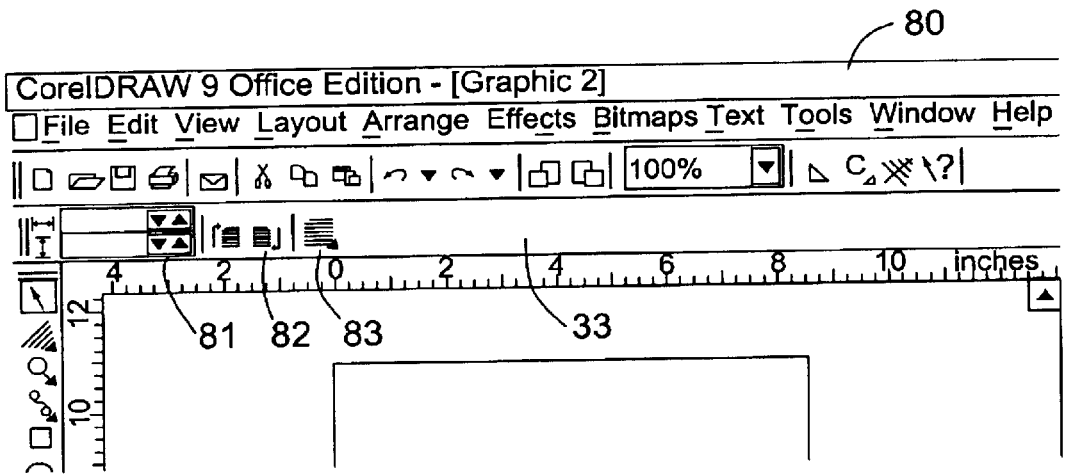

Once these items 62–64 are scrolled off, the system 10 shows the new on-screen items 81–83 for the rectangular tools in the property bar 33 as shown in the display 80 of FIG. 6D.

Thus, when the context of the application program changes, the previous content of the property bar 33 is scrolled off in a smooth animation, and the new set of control items appropriate to the new application context comes up in the property bar 33. Such a scrolling animation helps catching user's attention to the context-sensitivity of the property bar 33.

The content change processing system 10 may also allow the user or the application program to enable or disable the provision of the animation indicating the content change of the property bar. In that case, the content change processing system 10 checks if the content change animation is enabled (46) before scrolling off the contents of the property bar (50). If it is not enabled, the content change processing system 10 ends the process (56).

The property bar has the notion of "current application mode" which is used to remember the current property bar mode. It also keeps asking the application for the current mode. If it detects a change between the application mode and the current property bar mode, it preempts a mode change and remembers the new mode. When the application, and hence the property bar, starts up for the first time, the property bar's current mode is set to a mode indicating that it is unknown. When the application is started up, the current mode is updated. This is an internal mode change, but it is not a content change because of a user action. Accordingly, the content change processing system 10 may be set not to show the mode change animation until the initialization is completed. To this end, the content change processing system 10 may check if the application initialization is complete (48) before the scrolling of the contents of the property bar (50).

Another example is described with reference to FIGS. 7–10. This example shows a visual cue indicating internal value changes of spin controls.

Figure 9:
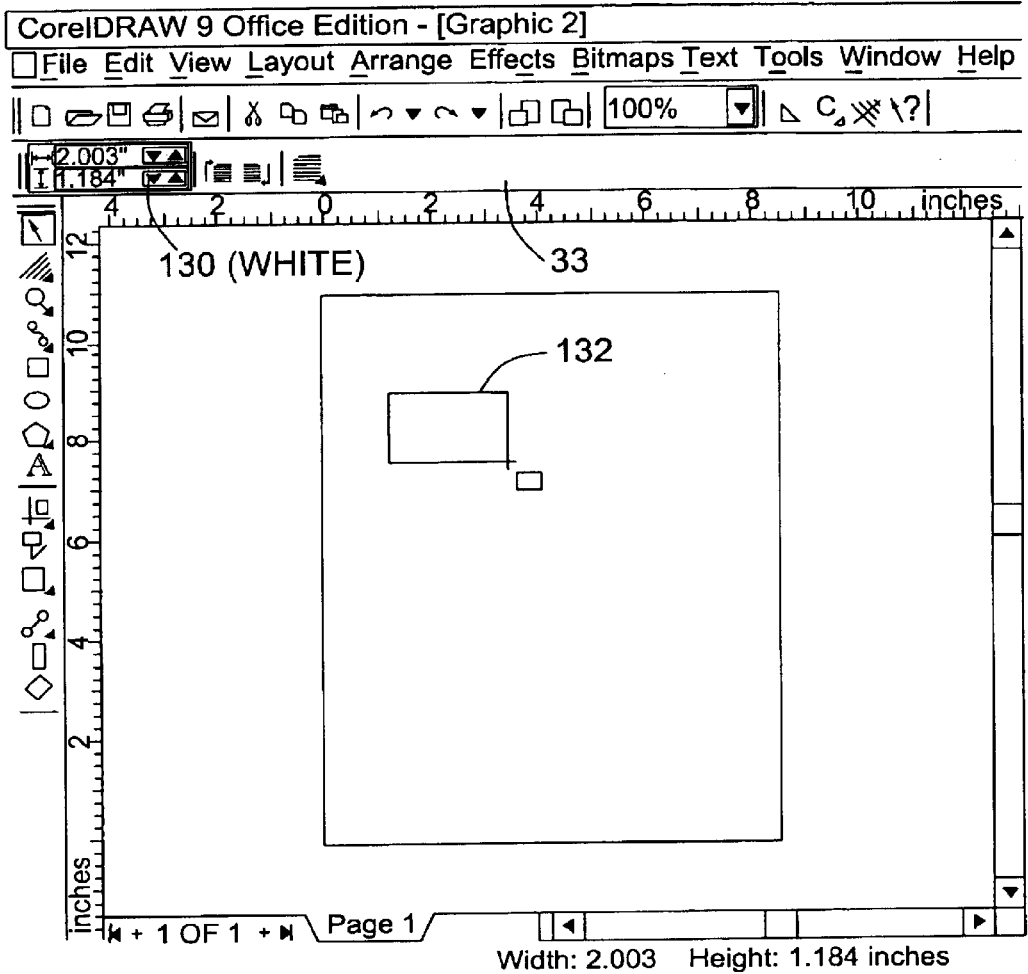
FIG. 9 is a diagram showing an example of a display image showing a visual cue provided by the method of FIG. 7.

Spin controls are represented by an on-screen item or spin box 130 on the property bar 33 shown in FIG. 9. When an object is selected, the spin box 130 displays the values of spin controls as the position and dimension of the selected object. When the user selects a different object, the control values displayed in the spin box 130 are changed. In this example, the visual cue is provided by changes in the background colours of the spin box 130.

The background colour of the spin box 130 may change only when a different object of the same object type as the original is selected. For example, when the user has a short rectangle and selects a long rectangle, the background colour of the spin box 130 changes. When the user has a rectangle and selects a circle, the whole property bar changes and there is no need to change the background colour of the property bar.

Figure 7:
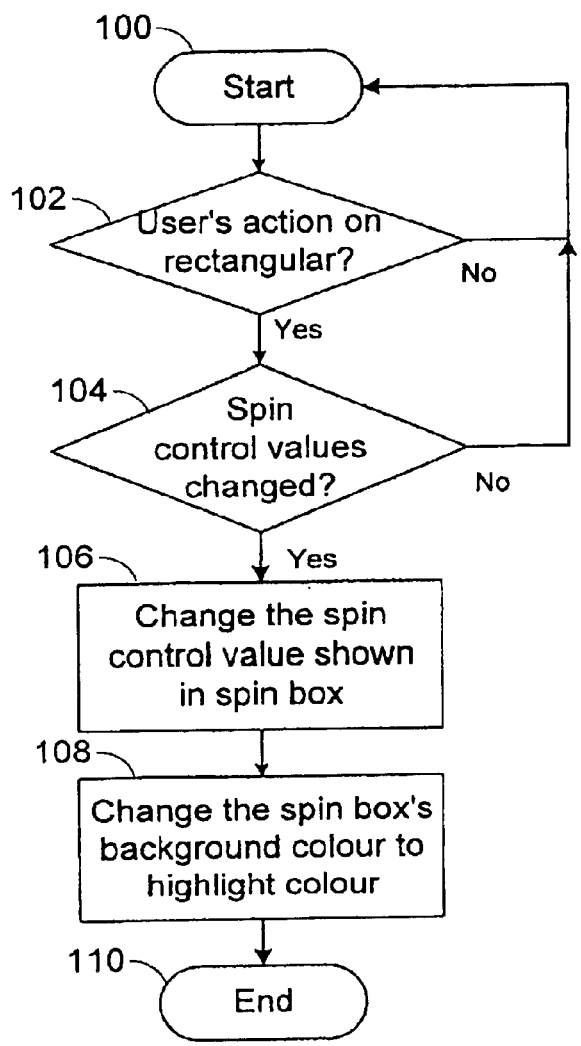
FIG. 7 is a flowchart showing an example of a method for processing a content change of a spin box.

Referring to FIG. 7, the user performs an action on a rectangular, e.g., the user starts to draw a rectangular or selects an existing rectangular for modification (102). In response to the user's action, the content change processing system 10 changes the internal value of spin control for the rectangular (104).

In response to the internal value change, the content change processing system 10 changes the value displayed in the spin box 130 (106). In order to attract user's attention to this change, the content change processing system 10 changes the background colour of the spin box 130 to a highlight colour (108).

Figure 10:
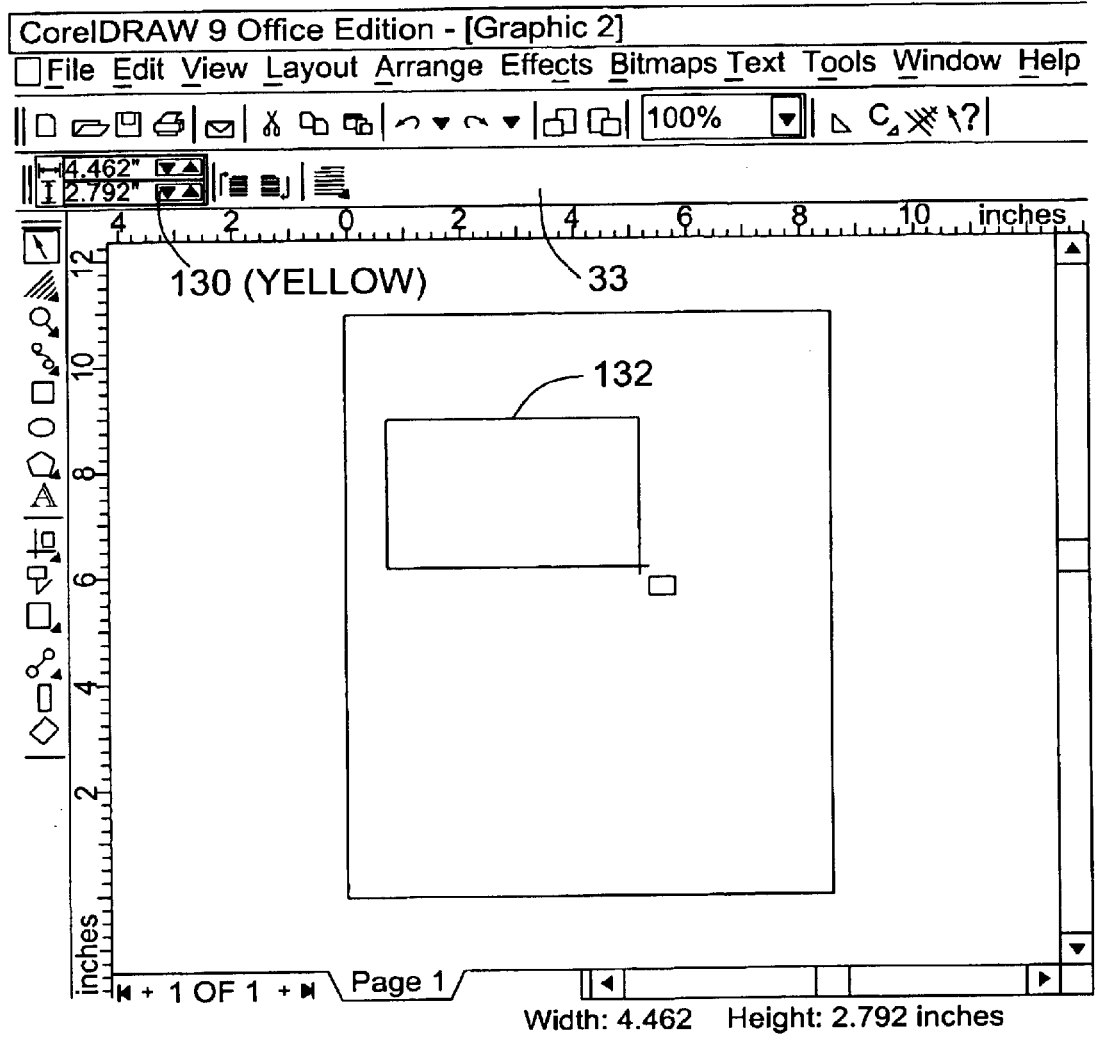
FIG. 10 is a diagram showing another example of a display image showing a visual cue provided by the method of FIG. 7.

The highlight colour may be any colour which is useful in catching user's attention. In this example, it is changed from original default white to light yellow for about half-a second every time their value changes. FIG. 9 shows the moment when the user is about to modify a rectangular 132. The background colour of the spin box 130 is the original default white. When the user modifies the rectangular 132, the background colour of the spin box 130 is changed to yellow for about half-a second, as shown in FIG. 10.

This colour change may be done only when the control value changes internally and not through an explicit user action on the spin controls.

Figure 8:
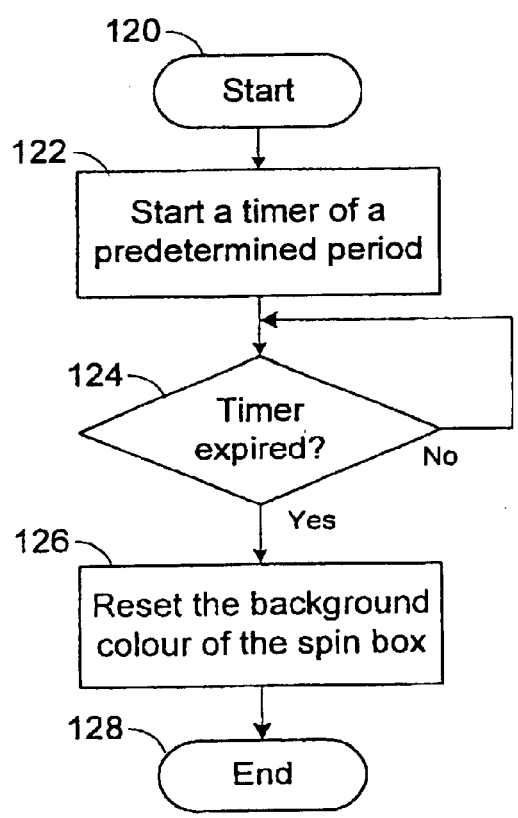
FIG. 8 is a flowchart showing an example of use of a timer in the method of FIG. 7.

As shown in FIG. 8, when the background colour of the spin box is changed to the highlight colour, the content change processing system 10 may start a timer of a predetermined period (122). When the timer expires (124), the content change processing system 10 resets the background colour of the spin box 130 to the original colour (126).

Instead of using a timer, the content change processing system 10 may reset the background colour of the spin box when the user takes a different action.

The visual cue system of the present invention may be implemented by any hardware, software or a combination of hardware and software having the above described features. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention. For example, the above embodiments uses toolbars, but the present invention may also be suitably applied to a tool pallet or other form of on-screen items.

What is claimed is:

1. A system for processing a content change of an on-screen item representing a feature of an application program, the system comprising:

a mode change detector for detecting a mode change of the application program caused by a user action;

a content changer for, in response to the mode change detector, changing a content of an on-screen item which is indirectly related to the user action; and a visual cue controller for providing a visual cue that indicates the content change of the on-screen item, by changing the appearance of the on-screen item in addition to changing the content.

2. A system as claimed in claim 1, wherein:

the content changer has a property changer for changing a property of the on-screen item; and the visual cue controller has an appearance changer for changing the appearance of the on-screen item.

3. A system as claimed in claim 2, wherein the appearance changer gradually changes the appearance of the on-screen item to a different appearance for a predetermined time period.

4. A system as claimed in claim 2, wherein the appearance changer is configured to change colour, design and/or shape of the on-screen item.

5. A system as claimed in claim 1, wherein:

the content changer has an item changer for changing the on-screen item from a first mode item representing a first feature to a second mode item representing a second feature; and the visual cue controller is configured to provide an animation showing the change from the first mode item to the second mode item.

6. A system as claimed in claim 5, wherein the visual cue controller is configured to provide a scrolling animation showing that the first mode item is scrolled off to change to the second mode item.

7. A method for processing a content change of an on-screen item representing a feature of an application program, the method comprising the steps of:

detecting a mode change of the application program caused by a user action;

changing, in response to the mode change of the application program, a content of an on-screen item which is indirectly related to the user action; and providing a visual cue that indicates the content change of the on-screen item, by changing the appearance of the on-screen item in addition to changing the content.

8. A method as claimed in claim 7, wherein the content changing step changes a property of the on-screen item; and the visual cue providing step changes the appearance of the on-screen item.

9. A method as claimed in claim 8, wherein the visual cue providing step gradually changes the appearance of the on-screen item to a different appearance for a predetermined period.

10. A method as claimed in claim 8, wherein the visual cue providing step changes the colour, design and/or shape of the on-screen item.

11. A method as claimed in claim 7, wherein the content changing step changes the on-screen item from a first mode item representing a first feature to a second mode item representing a second feature; and the visual cue providing step provides an animation showing the change from the first mode item to the second mode item.

12. A method as claimed in claim 11, wherein the visual cue providing step provides a scrolling animation showing that the first mode item is scrolled to change to the second mode item.

13. A method for providing a visual cue of a content change of an on-screen item representing a feature of an application program, the method comprising the steps of:

allowing a user to select an object displayed on the screen; and displaying a visual cue that indicates a content change of an on-screen item, which content change is caused indirectly by the selection or movement of the object by the user, by changing the appearance of the on-screen item in addition to changing the content.

14. A method as claimed in claim 13, wherein the displaying step displays the visual cue for a predetermined time period.

15. A method as claimed in claim 13, wherein the displaying step provides a change in the appearance of the on-screen item when a property of the on-screen item is changed.

16. A method as claimed in claim 15, wherein the displaying step gradually changes the appearance of the on-screen item to a different appearance for predetermined time period.

17. A method as claimed in claim 15, wherein the displaying step changes the colour, pattern and/or shape of the on-screen item.

18. A method as claimed in claim 13, wherein the displaying step displays an animation showing a change of the on-screen item from a first mode item representing a first feature of the application program to a second mode item representing a second feature of the application program.

19. A method as claimed in claim 18, wherein the displaying step scrolls off the first mode item to change to the second mode item.

20. A computer readable medium storing instructions or statements for use in the execution in a computer of a method for processing a content change of an on-screen item representing a feature of an application program, the method comprising the steps of:

detecting a mode change of the application program caused by a user action;

changing, in response to the mode change of the application program, a content of an on-screen item which is indirectly related to the user action; and providing a visual cue that indicates the content change of the on-screen item, by changing the appearance of the on-screen item in addition to changing the content.

21. A computer readable medium storing instructions or statements for use in the execution in a computer of a method for providing a visual cue of a content change of an on-screen item representing a feature of an application program, the method comprising the steps of:

allowing a user to select an object displayed on the screen; and displaying a visual cue that indicates a content change of an on-screen item, which content change is caused indirectly by the selection or movement of the object by the user, by changing the appearance of the on-screen item in addition to changing the content.

* * * * *